(12) United States Patent
Schreuder et al.

(10) Patent No.: US 6,688,625 B1
(45) Date of Patent: Feb. 10, 2004

(54) BICYCLE HAVING PEDAL DRIVE, AND PEDAL DRIVE

(75) Inventors: Jan A. M. Schreuder, Amsterdam (NL); Jorrit W. Schoonhoven, Amsterdam (NL)

(73) Assignee: Accell Group N.V., Heerenveen (NL)

( * ) Notice: Subject to any disclaimer, the term of this patent is extended or adjusted under 35 U.S.C. 154(b) by 0 days.

(21) Appl. No.: 09/701,918

(22) PCT Filed: Jun. 4, 1999

(86) PCT No.: PCT/NL99/00348
§ 371 (c)(1),
(2), (4) Date: Aug. 28, 2001

(87) PCT Pub. No.: WO99/62759
PCT Pub. Date: Dec. 9, 1999

(30) Foreign Application Priority Data

Jun. 4, 1998 (NL) .............................................. 1009314

(51) Int. Cl.⁷ .............................................. B62K 15/00
(52) U.S. Cl. ......................... 280/260; 280/278; 280/287
(58) Field of Search ................................ 280/260, 261, 280/259, 287, 284, 281.1, 278

(56) References Cited

U.S. PATENT DOCUMENTS

| | | | |
|---|---|---|---|
| 1,360,032 A | * 11/1920 | Schiffner | |
| 1,535,714 A | * 4/1925 | Burke | |
| 3,979,136 A | 9/1976 | Lassiere | |
| 4,440,414 A | * 4/1984 | Wang | 280/287 |
| 4,579,360 A | * 4/1986 | Nishimura et al. | 280/278 |
| 5,102,155 A | * 4/1992 | Chou | 280/236 |
| 5,299,819 A | * 4/1994 | Leu | 280/260 |
| 5,360,225 A | * 11/1994 | Chen | 280/278 |
| 5,452,910 A | * 9/1995 | Harris | 260/284 |
| 5,577,749 A | * 11/1996 | Ross | 280/261 |
| 5,593,168 A | * 1/1997 | Chou | 280/275 |
| 5,810,379 A | * 9/1998 | Shusterman | 280/231 |
| 5,873,590 A | * 2/1999 | Abe et al. | 280/259 |
| 5,979,924 A | * 11/1999 | D'Aluisio et al. | 280/261 |
| 5,997,022 A | * 12/1999 | Matsui | 280/284 |
| 6,079,726 A | * 6/2000 | Busby | 280/261 |
| 6,347,803 B1 | * 2/2002 | Berges | 280/260 |

FOREIGN PATENT DOCUMENTS

EP 0 505 598 9/1992

* cited by examiner

Primary Examiner—Avraham Lerner
(74) Attorney, Agent, or Firm—Kinney & Lange, P.A.

(57) ABSTRACT

Bicycle (1), comprising a first frame part (2) connected to a second frame part (13). The second frame part (13) is provided with a drive (14), comprising a crankshaft (16) carrying a driving gear blade (19) and a rear axle (17) carrying a driven gear blade (23). The bicylce (1) has as a particular feature that the drive (14) further comprises a gear hub (18) carrying a first, input gear blade (27) and a second, output gear blade (28), which gear hub (18) is mounted on the second frame part (13) at a distance from the rear axle (17).

15 Claims, 2 Drawing Sheets

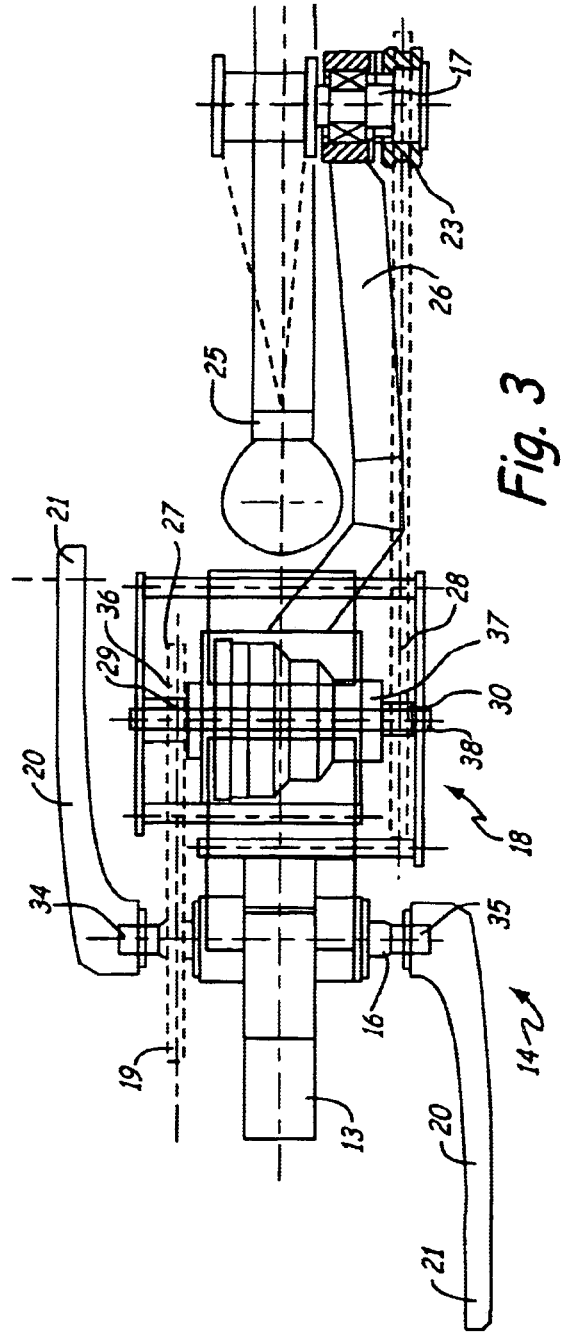
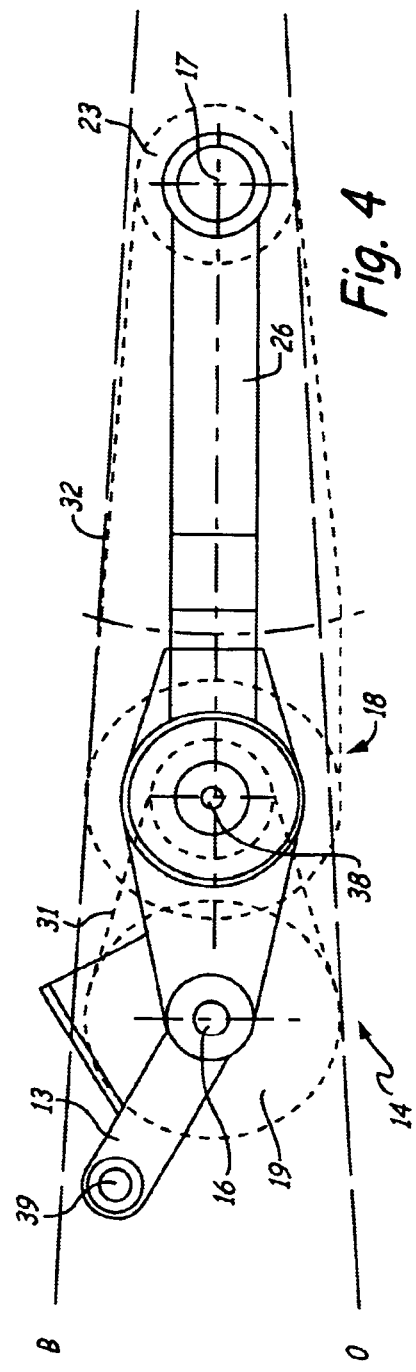

BICYCLE HAVING PEDAL DRIVE, AND PEDAL DRIVE

The invention relates to a bicycle, comprising a first frame part connected to a second frame part, which second frame part is provided with a drive, comprising a crankshaft carrying a driving gear blade and a rear axle carrying a driven gear blade and a gear mechanism for setting the transmission ratio between the crankshaft and the rear axle.

Such bicycle is known from EP 0 505 598. EP0 505 598 describes a bicycle, in particular suitable for adults, whose frame has a compact construction, as a result of which the bicycle occupies little space when not used. In the known bicycle, the gear mechanism is comprised with a free, rigid axle carrying a first, input gear blade or pinion that is coupled to the driving gear blade and which rigid axle further carries a second, output gear blade or crown wheel that is coupled via a derailleur to the rear axle carrying a number of drivable gear blades. In the known bicycle, the free rigid axle of the gear mechanism provides for a fixed transmission ratio between the input gear blade and the output gear blade, enabling a fixed reduction between the crankshaft and the rear axle. The derailleur is used to set the transmission ratio between the crankshaft and the rear axle.

A drawback of the known bicycle is that the derailleur mechanism occupies relatively much space. In particular, at the extreme transmission ratio, the maximally allowable obliquity of the chain between the gear blades of the free axle and the rear axle defines a relatively large minimal distance between the free axle and the rear axle. Further, the derailleur mechanism requires relatively much maintenance and the reliability in operation of the derailleur mechanism, when maintained insufficiently, is relatively low.

U.S. Pat. No. 3,979,136 also describes a foldable bicycle having a gear mechanism comprising a fixed, rigid axle carrying a gear mechanism providing for a fixed transmission ratio enabling a reduction between the crankshaft and the rear axle. A three speed settable hub is mounted in the rear wheel to set the transmission ratio between the crankshaft and the rear wheel.

The object of the invention is to provide a bicycle of the type mentioned in the preamble, in particular a compact bicycle having wheels of a relatively small diameter, which bicycle does not have the above-mentioned drawbacks.

To that end, a bicycle according to the invention is characterized in that the gear mechanism comprises a gear hub having a settable transmission ratio carrying a first, input gear blade coupled to the driving gear blade of the crankshaft and a second, output gear blade coupled to the driven gear blade of the rear axle, such that the transmission ratio between the first, input gear blade and the second, output gear blade can be set, which gear hub is mounted on the second frame part at a distance from the rear axle.

Through the use of the gear hub it is effected that the drive can be of a more compact design, while the reliability in operation can be increased and the maintenance can be limited. Moreover, the rear axle can now be constructed with only one gear wheel, so that a simpler rear axle can be used. It is further achieved that in the drive, a gear hub can be used that is normally accommodated in a rear wheel of a large diameter, that is, a diameter of 26 inch (66.04 cm) or 28 inch (71.12 cm). Since such gear hubs are already mass-produced and can be obtained relatively cheap, this reduces the costs of the bicycle considerably.

In another embodiment, a bicycle according to the invention is characterized in that the first frame part is connected to the second frame part for pivoting relative to a pivotal axis, such that the frame parts can pivot between an operating position of the bicycle in which the wheels of the bicycle are substantially in line, and a folded position of the bicycle in which the wheels are substantially located side by side.

Preferably, the pivotal axis extends substantially vertically and the first frame part carries a saddle, while the second frame part comprises a single supporting arm for the rear axle. It is thus achieved that in folded condition, the bicycle occupies little space, while the pedal drive is located entirely within the second frame part. This last facilitates the pivoting action between the operating position and the folded position and simplifies the construction of the bicycle.

It is observed that in this context, the expression that the gear hub is located at a distance from the rear axle should at least be understood to mean that the center line of the gear hub does not coincide with the center line of the rear axle.

The invention also relates to a pedal drive.

These and further advantages of the invention will be specified with reference to an exemplary embodiment of a bicycle according to the invention shown in the accompanying drawings. In these drawings:

FIG. 3 is a partially cutaway, schematic top plan view of a pedal drive of the bicycle of FIG. 1; and FIG. 4 is a schematic side elevation of the drive of FIG. 3.

It is observed that the Figures are only schematic representations of a preferred embodiment of the invention. In the Figures, identical or corresponding parts have been designated by the same reference numerals.

Figure 1:
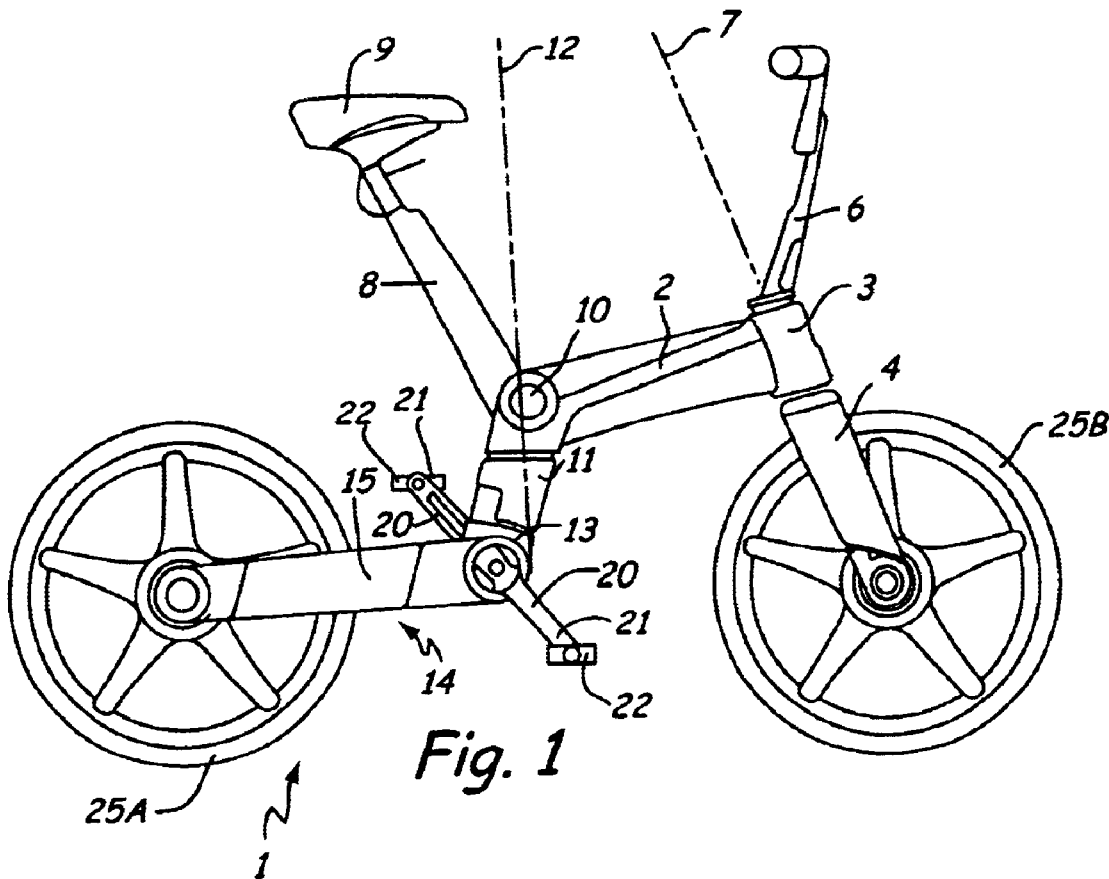
FIG. 1 is a schematic side elevation of a foldable bicycle with pedal drive in operating condition.

FIG. 1 shows a foldable bicycle 1 in operating condition. The bicycle 1 is suitable for adults and has a compact construction. The bicycle 1 has a first frame part 2 with a steering head 3. The steering head 3 carries a single supporting arm 4 in which a front wheel 25B is included. By means of a handlebar 6, the supporting arm 4 can be pivoted relative to the first frame part 2 about a substantially vertical pivotal axis 7. The first frame part 2 further comprises a saddle arm 6 carrying a saddle 9. The saddle arm 8 is connected to the first frame part 2 so as to be pivotable relative to a substantially horizontal pivotal axis 10.

On a side remote from the steering head 3, the first frame part 2 is connected to a second frame part 13 for pivoting relative to a substantially vertical pivotal axis 12 by means of a lockable hinge 11. In the operating position shown, the hinge 11 is locked by means of a locking mechanism not shown. Further, spring means, not shown, may be accommodated adjacent the hinge 11, which spring means enable a spring movement of the frame parts 2, 13 relative to each other.

The second frame part 13 comprises a pedal drive globally indicated by reference numeral 14. The pedal drive 14 is at least partially integrated with a single supporting arm 26. The supporting arm 26 and the pedal drive 14 are surrounded by a slender housing 15. The housing 15 protects the pedal drive 14 from entering dirt and also prevents the clothes of a rider of the bicycle from possibly being fouled by parts of the pedal drive 14. Further, the slender housing provides the bicycle with an open appearance.

The supporting arm 26 carries a rear wheel 25A. The diameter of the rear wheel 25A is relatively small, at least considerably smaller than 26 inch (66.04 cm), preferably smaller than 22 inch (55.88 cm), in particular about 20 (50.8 cm) or 16 inch (40.0 cm). It is observed that the diameters of the wheels 25A, 25B are stated here in inches, because this is conventional in the field of bicycles, and that 1 inch corresponds to 2.54 cm.

The bicycle 1 can be folded in for reducing the space occupied when the bicycle 1 is not used. This enables for instance placing the bicycle 1 into a trunk of a motorcar, or putting it up or storing it in a small space, such as a cupboard. To illustrate this, the bicycle 1 is shown in folded-in position in FIG. 2.

The construction of the bicycle 1 is described in NL-A-1006637.

With reference to FIGS. 3 and 4, the pedal drive 14 is shown therein without the housing 15. The pedal drive 14 comprises a crankshaft 16, a rear axle 17 and a gear hub 13. The crankshaft 16 carries a driving gear blade 19 and is provided, adjacent opposite ends 34, 35 thereof, with cranks 20 that each carry one pedal 22 adjacent their free ends 21 (FIG. 1). The crankshaft 16, the cranks 20 and the pedals 22 are constructed in the conventional manner and are conventionally mounted on the second frame part 13 for rotation.

The rear axle 17 carries a driven gear blade 23. The rear axle 17 further carries the rear wheel 25A, via a hub 24. By means of the single supporting arm 26, the rear axle 17 is attached to the second frame part 13. Although by means of a single supporting arm 26, the space occupied by the bicycle 1 in folded condition can be reduced substantially, it is observed that the rear axle 17 may also be conventionally attached to the frame 1 two-sidedly by a rear fork.

The second frame part 13 further comprises a gear hub 18 carrying a first, input gear blade 27 and a second, output gear blade 28, such that a settable transmission ratio is possible between the first, input gear blade 27 of the gear hub 18 and the second, output gear blade 28 of the gear hub.

The gear hub 18 comprises a first hub part 36 carrying the first, input gear blade 27 at an end 29 thereof, and a second hub part 37 carrying the second, output gear blade 28 at an end 30 thereof. The hub parts 36, 37 are each mounted so as to be rotatable relative to a through support 38, which support 38 is fixedly connected to the second frame part 13. The hub parts 36, 37 are further coupled so as to be rotatable relative to each other. The coupling is designed so that the transmission ratio between the hub parts 36, 37, i.e. the difference between the speed of revolution of the input hub part 36 and that of the output hub part 37, is settable. The construction and the operation of a gear hub are generally known and are therefore not further specified here.

Preferably, the first and second gear blades 27, 28 are each mounted on the gear hub 18 adjacent an opposite end 29, 30 thereof. Of course, it is also possible to position the first and second gear blades 27, 28 adjacent one end of the gear hub 18. By means of a first chain or toothed belt 31, the first, input gear blade 27 of the gear hub 18 is coupled to the driving gear blade 19 of the crankshaft 16, while by means of a second chain or toothed belt 32, the second, output gear blade 28 of the gear hub 18 is coupled to the driven gear blade 8 of the rear axle 17. Of course, instead of a chain or toothed belt, a belt or rope may also be applied.

When the diameter of the first, input gear blade 27 is sufficiently smaller than the diameter of the second, output gear blade 28, in particular a gear hub 18 can be employed that is conventionally used in the rear wheel of a bicycle having a rear wheel of a large diameter, for instance 26 inch (66.04 cm) or 28 inch (71.12 cm). In such conventional gear hubs, the transmission ratio between the input hub part and the output hub part is for instance settable between 2.7 and 5.0 (four-speed hub) or between 2.1 and 5.3 (seven-speed hub). The use of such gear hub yields a considerable cost saving during the assembly of the bicycle 1, since such gear hubs are already produced in large numbers. In that case, for instance the first, input gear wheel 27 can be mounted on the input hub part 36 in the usual manner, while the second, output gear wheel 28 can be mounted on a flange of the second hub part 37, to which flange the spokes of the rear wheel are usually attached.

Further, through the use of a gear hub 18, it is achieved that the rear axle 17 can be one-sidedly supported by a supporting arm 26, unlike the rear wheel whose gear hub is integrated with the rear axle 17, which should be supported on two sides.

Figure 2:
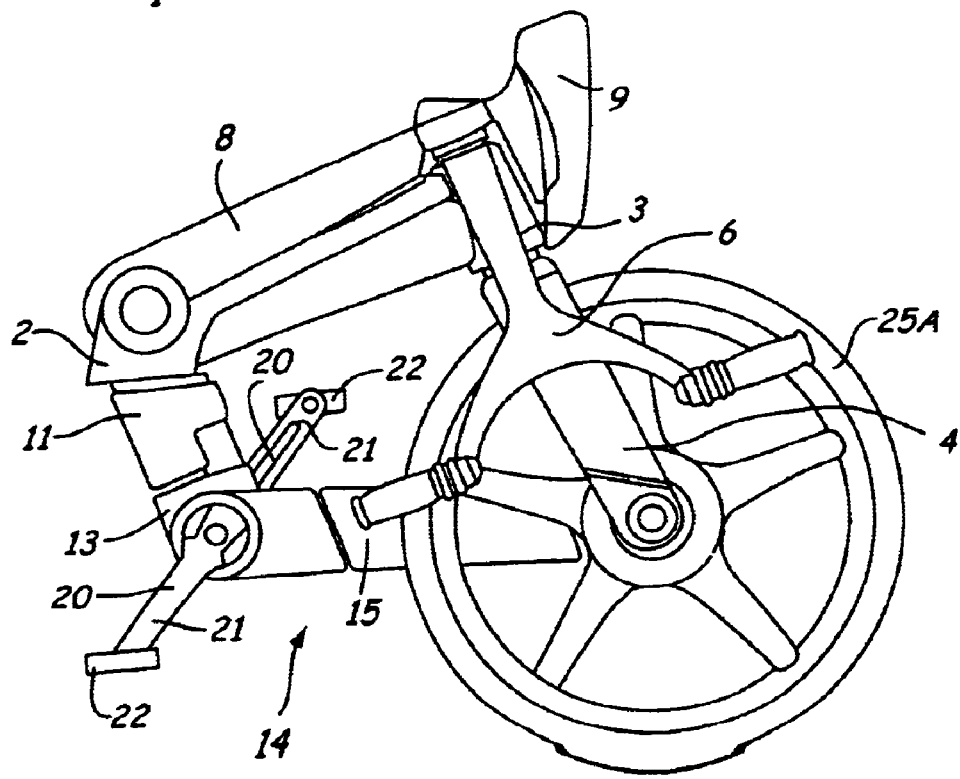
FIG. 2 is a schematic side elevation of the bicycle of FIG. 1 in folded condition.

Preferably, the diameter of the first, input gear blade 27 of the gear hub 18 is smaller than chat of the second, output gear blade 28 of the gear hub 18, as shown in FIGS. 1 and 2. Thus, a greatest possible transmission ratio is realized between the crankshaft 16 and the rear axle 17, i.e. one revolution of the crankshaft 16 results in a suitable, large number of revolutions of the rear axle 17.

FIG. 4 shows that the gear hub 18, viewed in side elevation of the bicycle 1, is located between an upper common tangent line B of the driving gear blade 19 of the crankshaft 16 and the driven gear blade 23 of the rear axle 17, and a lower common tangent line 0 of the driving gear blade 19 of the crankshaft 16 and the driven gear blade 23 of the rear axle 17. The effect thus achieved is that the pedal drive 14 can readily be provided with a slender, robust housing 15. Such housing 15 enhances the reliability of operation of the drive 14 considerably, in that the ingress of dirt is impeded.

Preferably, the gear hub 18, viewed in the direction of travel of the bicycle 1, is located between the crankshaft 16 and the rear axle 17. It is thus provided that the length of the second frame part 13 can be substantially equal to the distance between the crankshaft 16 and the rear axle 17, which reduces the space occupied by the bicycle 1.

It is observed that it is possible to fit the pedal drive 14 with spring action relative to a horizontal pivotal axis 39, for instance by connecting the second frame part 13 with the pedal drive 14 to the bottom side of the hinge 11 so as to be pivotable as a rigid whole relative to a horizontal pivotal axis 39, and by providing spring means for obstructing the pivotal movement. By incorporating the drive 14 into the second frame part 13, the course of the chains 31, 32 can be prevented from being disturbed by the spring means springing inwards and outwards.

When the pedal drive 14 is provided with a spring, it is preferred that the gear hub 18 be mounted on the second frame part 13 close to the horizontal pivotal axis 39. It can thus be provided that during a spring movement, the moment of inertia of the second frame part 13 relative to the pivotal axis can be smaller, which improves the spring characteristic of the bicycle 1 compared with a situation where the relatively heavy gear hub 18 is located adjacent the rear axle 17.

By incorporating the pedal drive 14 entirely into the second frame part 13 of the bicycle 1, it is further possible to move the pedal drive 14 together with the second frame part 13 into and out of said folded position. This prevents a user's clothes from being fouled when the bicycle is being folded and unfolded, and simplifies the folding and unfolding of the bicycle In an advantageous manner, the pedal drive 14 enclosed by the housing 15 can be manufactured as a separate unit, such as a so-called subassembly. This enables the pedal drive 14 to be fitted onto the bicycle as a unit, for instance by fixing a bolt or pin joint between the drive 14 and the lower end of the hinge 11. During assembly of the bicycle, the drive 14 can then be supplied as a ready-made, loose unit. Thus, the logistics during assembly of a bicycle in a factory can be simplified substantially, while, further, the level of knowledge required for the assembly can be lower. In addition, final assembly of the drive on the bicycle can be performed by the seller or even by the buyer, so that the bicycle can occupy less space during transport from the factory to the seller/buyer.

Further, if a defect should occur in the drive during use, it can be disassembled and replaced as a separate unit. Thus, a bicycle having a defective drive can be repaired without the repairer requiring any special knowledge or special tools. A disassembled defective drive can then be sent to a specialist for being repaired.

By providing the drive with quick-action couplings for connecting control cables for the gear hub and/or a rear brake, the mounting of the drive onto the bicycle can be further facilitated.

It is observed that the invention is by no means is limited to the embodiments described and shown in the description and the Figures. Many variations thereof are possible. For instance, the invention is not limited to a foldable bicycle. The invention may also be advantageously applied to other bicycles with or without a pivotable frame, such as a bicycle of which a first part of the frame is spring-connected to a second part of the frame. Further, the front wheel as well as the rear wheel may be connected to the frame in a conventional manner by means of a forked supporting construction.

Moreover, the diameters of the wheels may be chosen to be different and the gear hub and/or the crankshaft may also be accommodated in the supporting arm. It is also possible that, viewed in the direction of travel, the gear hub islocated elsewhere, for instance in front of the crankshaft.

Further, it is possible that the gear hub is integrated with or concentric with the crankshaft, which, as a matter of fact, may also be advantageous in respect of other types of bicycles.

These and many other variations are understood to fall within the framework of the invention as expressed in the following claims.

What is claimed is:

1. A bicycle, comprising a first frame part connected to a second frame part, said second frame part being provided with a drive, comprising a crankshaft carrying a driving gear blade and a rear axle carrying a driven gear blade and a gear mechanism for setting the transmission ratio between the crankshaft and the rear axle, characterized in that the gear mechanism comprises a gear hub having a settable transmission ratio carrying a first, input gear blade coupled to the driving gear blade of the crankshaft and a second, output gear blade coupled to the driven gear blade of the rear axle, such that the transmission ratio between the first, input gear blade and the second, output gear blade can be set, said gear hub being mounted on the second frame part at a distance from the rear axle, wherein the drive is mounted on the second frame part as a drive subassembly via a fastener through the second frame part so that the drive subassembly is detachable as a unit.

2. A bicycle according to claim 1, wherein the gear hub comprises a first hub part carrying the first, input gear blade and a second hub part carrying the second, output gear blade.

3. A bicycle according to claim 2, wherein the hub parts are mounted so as to be rotatable relative to a support and wherein the support is fixedly connected to the second frame part.

4. A bicycle according to claim 1, wherein the diameter of the first, input gear blade is smaller than the diameter of the second, output gear blade.

5. A bicycle according to claim 1, wherein the first, input gear blade and the second, output gear blade are attached to the gear hub adjacent opposite ends thereof.

6. A bicycle according to claim 1, wherein the gear hub, viewed in side elevation of the bicycle, is located between an upper common tangent line of the driving gear blade of the crankshaft and the driven gear blade of the rear axle, and a lower common tangent line of the driving gear blade of the crankshaft and the driven gear blade of the rear axle.

7. A bicycle according to claim 1, wherein the gear hub, in direction of travel of the bicycle, is located between the crankshaft and the rear axle.

8. A bicycle according to claim 1, wherein the driving gear blade of the crankshaft and the first, input gear blade of the gear hub are coupled by means of a first chain or toothed belt and wherein the second, output gear blade of the gear hub and the driven gear blade of the rear axle are coupled by means of a second chain or toothed belt.

9. A bicycle according to claim 1, wherein the second frame part comprises a single supporting arm carrying the rear axle.

10. A bicycle according to claim 1, wherein the first frame part is connected to the second frame part for pivoting relative to a pivotal axis, such that the frame parts can pivot between an operating position of the bicycle in which the wheels of the bicycle are substantially in line, and a folded position of the bicycle in which the wheels are substantially located side by side.

11. A bicycle according to claim 1, wherein the connection between the first frame part and the second frame part comprises:

a lockable hinge for pivoting relative to a substantially vertical axis; and a spring means enabling vertical movement of the first frame part relative to the second frame part.

12. A bicycle according to claim 10, wherein the pivotal axis extends substantially vertically.

13. The bicycle according to claim 1, wherein the gear hub is mounted on the second frame part at a distance from the rear axle.

14. The bicycle according to claim 13 wherein the pedal drive includes a housing which surrounds the pedal drive at least partially.

15. A foldable bicycle comprising:

a first frame part;

a second frame part connected to the first frame part;

a hinge for connecting the first frame part and the second frame part and for pivoting the first frame part relative to the second frame part about a pivot axis; and a drive mounted to the second frame part, the drive comprising:

a crankshaft carrying a driving gear blade;

a rear axle carrying a driven gear blade; and a gear mechanism coupled between the driving gear blade of the crankshaft and the driven gear blade ofthe rear axle, the gear mechanism having a settable transmission ratio permitting a rider to set the transmission ratio to varying speeds between the crankshaft and the rear axle, wherein the drive is releasably mounted to the second frame part via a fastener disposed between the drive and a lower end of the hinge.

\* \* \* \* \*

UNITED STATES PATENT AND TRADEMARK OFFICE
CERTIFICATE OF CORRECTION

PATENT NO. : 6,688,625 B1 Page 1 of 1
DATED : February 10, 2004
INVENTOR(S) : Schreuder et al.

It is certified that error appears in the above-identified patent and that said Letters Patent is hereby corrected as shown below:

Column 2,
Line 44, delete "saddle arm 6", insert -- saddle arm 8 --

Column 3,
Line 16, delete "gear hub 13", insert -- gear hub 18 --

Column 5,
Line 34, delete "islocated", insert -- is located --

Column 6,
Line 17, delete "toothed belt", insert -- toothed belt, --
Line 59, delete "ofthe", insert -- of the --

Signed and Sealed this

Twenty-eighth Day of June, 2005

JON W. DUDAS
*Director of the United States Patent and Trademark Office*